US011939555B2

(12) United States Patent
Partain, III et al.

(10) Patent No.: US 11,939,555 B2
(45) **Date of Patent: *Mar. 26, 2024**

(54) FABRIC CARE COMPOSITION

(71) Applicants: Dow Global Technologies LLC, Midland, MI (US); Rohm and Haas Company, Collegeville, PA (US)

(72) Inventors: Emmett M. Partain, III, Bound Brook, NJ (US); Jan E. Shulman, Newtown, PA (US); Aline Migliore, Villeneuve Loubet (FR); Yunshen Chen, Lexington, MA (US); John Hayes, Douglassville, PA (US); Asghar A. Peera, Royersford, PA (US); Peilin Yang, Pearland, TX (US); Mariann Clark, Morrisville, PA (US); Stephen J. Donovan, Sellersville, PA (US); Jennifer P. Todd, Willow Grove, PA (US); Cynthia Leslie, Montgomeryville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/262,272

(22) PCT Filed: Aug. 29, 2019

(86) PCT No.: PCT/US2019/048693

§ 371 (c)(1),
(2) Date: Jan. 22, 2021

(87) PCT Pub. No.: WO2020/051049

PCT Pub. Date: Mar. 12, 2020

(65) Prior Publication Data

US 2021/0324303 A1 Oct. 21, 2021

(30) Foreign Application Priority Data

Sep. 6, 2018 (EP) .................................... 18290101

(51) Int. Cl.

| | |
|---|---|
| ***C11D 3/22*** | (2006.01) |
| ***C11D 1/831*** | (2006.01) |
| ***C11D 3/00*** | (2006.01) |
| ***C11D 11/00*** | (2006.01) |
| *C11D 1/14* | (2006.01) |

(Continued)

(52) U.S. Cl.

CPC .............. *C11D 3/227* (2013.01); *C11D 1/831* (2013.01); *C11D 3/0015* (2013.01); *C11D 3/0036* (2013.01); *C11D 1/146* (2013.01); *C11D 1/22* (2013.01); *C11D 1/72* (2013.01); *C11D 2111/12* (2024.01)

(58) Field of Classification Search

CPC .... C11D 3/227; C11D 11/0017; C11D 3/0036

See application file for complete search history.

(56) References Cited

U.S. PATENT DOCUMENTS 4,911,919 A * 3/1990 Patel ...................... A61K 8/731 424/47
5,338,541 A 8/1994 Matz et al.

(Continued)

FOREIGN PATENT DOCUMENTS

EP 3074495 10/2016
JP 2015078351 4/2015

(Continued)

OTHER PUBLICATIONS

Fabrics made of Human Hair. Specialty Fabrics Review.com NPL (Year: 2022).*

(Continued)

*Primary Examiner* — Nicole M. Buie-Hatcher
*Assistant Examiner* — M. Reza Asdjodi
(74) *Attorney, Agent, or Firm* — Thomas S. Deibert

(57) ABSTRACT

A fabric care composition is provided including water; a modified carbohydrate polymer having a weight average molecular weight of <500,000 Daltons and a Kjeldahl nitrogen content corrected for ash and volatiles, TKN, of ≥0.5 wt %; and a cleaning surfactant; wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I)

(I)

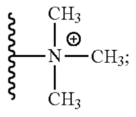

and dimethyl(alkyl) ammonium moieties having formula (II)

(II)

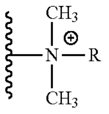

wherein each R is independently selected from a $C_{8-22}$ alkyl group.

8 Claims, No Drawings

(51) Int. Cl.

| | |
|---|---|
| *C11D 1/22* | (2006.01) |
| *C11D 1/72* | (2006.01) |

(56) References Cited

U.S. PATENT DOCUMENTS

| | | | | |
|---|---|---|---|---|
| 6,238,486 | B1 | 5/2001 | Dunham et al. | |
| 6,554,869 | B2 | 4/2003 | Aubay et al. | |
| 6,833,347 | B1 * | 12/2004 | Wang | C11D 3/227 510/330 |
| 7,056,879 | B2 * | 6/2006 | Wang | C11D 3/3757 510/276 |
| 7,056,880 | B2 | 6/2006 | Wang et al. | |
| 10,604,723 | B2 * | 3/2020 | Eldredge | C11D 3/227 |
| 2004/0151681 | A1 * | 8/2004 | Busk | A61Q 19/00 424/70.13 |
| 2005/0101503 | A1 | 5/2005 | Caldwell | |
| 2010/0132132 | A1 * | 6/2010 | Zhang | A61P 9/10 8/406 |
| 2012/0295831 | A1 * | 11/2012 | Masters | C11D 3/0094 510/432 |
| 2013/0217608 | A1 | 8/2013 | Allen | |
| 2017/0275562 | A1 * | 9/2017 | Oberlin | C11D 11/0017 |
| 2017/0335242 | A1 * | 11/2017 | Eldredge | C07C 211/63 |
| 2021/0324303 | A1 * | 10/2021 | Partain, III | C11D 3/0036 |

FOREIGN PATENT DOCUMENTS

| | | | | |
|---|---|---|---|---|
| WO | WO-2005000903 | A1 * | 1/2005 | A61K 8/731 |
| WO | 2008042685 | | 4/2008 | |
| WO | WO-2014052396 | A1 * | 4/2014 | C11D 3/227 |
| WO | WO-2015078692 | A1 * | 6/2015 | C11D 3/227 |
| WO | 2016077207 | | 5/2016 | |
| WO | WO-2021118774 | A1 * | 6/2021 | C11D 11/0017 |

OTHER PUBLICATIONS

Sibilia., "A Guide to Materials Characterization and Chemical Analysis." 1988, p. 81-84.

Office Action from corresponding Japanese Application No. 2021-507647 dated Aug. 15, 2023.

Office Action from corresponding Brazilian Application No. 112021003217-7 dated Aug. 3, 2023.

* cited by examiner

FABRIC CARE COMPOSITION

The present invention relates to a fabric care composition. In particular, the present invention relates to a fabric care composition including water; a modified carbohydrate polymer having a weight average molecular weight of <500,000 Daltons and a Kjeldahl nitrogen content corrected for ash and volatiles, TKN, of ≥0.5 wt %; and a cleaning surfactant; wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I) and dimethyl(alkyl) ammonium moieties having formula (II); wherein each R is independently selected from a $C_{8-22}$ alkyl group.

Use of cationic carbohydrate polymers in laundry detergents is known, as in, e.g., U.S. Pat. No. 6,833,347. However, this references does not suggest the use of the modified polymers described herein.

A modified carbohydrate polymer having quaternary ammonium groups has been disclosed for use in fabric care by Eldredge, et al. in U.S. Patent Application Publication No. 20170335242. Eldredge, et al disclose a fabric care composition comprising a modified carbohydrate polymer having quaternary ammonium groups having at least one $C_{8-22}$ alkyl or alkenyl group; wherein the modified carbohydrate polymer has a weight-average molecular weight of at least 500,000; and wherein at least 20 wt % of the quaternary ammonium groups on the at least one modified carbohydrate polymer have at least one $C_{8-22}$ alkyl or alkenyl group.

Notwithstanding, there remains a continuing need for fabric care compositions having a desirable balance of performance properties, particularly softening and anti-redeposition.

The present invention provides a fabric care composition comprising: water; a modified carbohydrate polymer having a weight average molecular weight of <500,000 Daltons and a Kjeldahl nitrogen content corrected for ash and volatiles, TKN, of ≥0.5 wt %; and a cleaning surfactant; wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I)

(I)

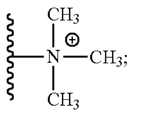

and dimethyl(alkyl) ammonium moieties having formula (II)

(II)

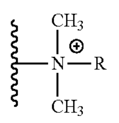

wherein each R is independently selected from a $C_{8-22}$ alkyl group.

The present invention provides a fabric care composition comprising: water; a modified carbohydrate polymer having a weight average molecular weight of <500,000 Daltons and a Kjeldahl nitrogen content corrected for ash and volatiles, TKN, of ≥0.5 wt %; and a cleaning surfactant; wherein a weight ratio of the modified carbohydrate polymer to the cleaning surfactant in the fabric care composition is 1:5 to 1:60; wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I) and dimethyl(alkyl) ammonium moieties having formula (II), wherein each R is independently selected from a $C_{8-22}$ alkyl group.

DETAILED DESCRIPTION

It has been found that a fabric care composition including a unique modified carbohydrate polymer having a weight average molecular weight of <500,000 Daltons and a Kjeldahl nitrogen content corrected for ash and volatiles, TKN, of ≥0.5 wt %; and a cleaning surfactant (preferably, in a weight ratio of the modified carbohydrate polymer to the cleaning surfactant in the fabric care composition of 1:5 to 1:60); wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I) and dimethyl(alkyl) ammonium moieties having formula (II); wherein each R is independently selected from a $C_{8-22}$ alkyl group; provides a surprisingly favorable balance of softening and anti-redeposition.

Unless otherwise indicated, ratios, percentages, parts, and the like are by weight. Weight percentages (or wt %) in the composition are percentages of dry weight, i.e., excluding any water that may be present in the composition.

As used herein, unless otherwise indicated, the terms “weight average molecular weight” and “Mw” are used interchangeably to refer to the weight average molecular weight as measured in a conventional manner with gel permeation chromatography (GPC) and conventional standards, such as polyethylene glycol standards. GPC techniques are discussed in detail in Modem Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. Weight average molecular weights are reported herein in units of Daltons.

Preferably, the fabric care composition of the present invention, comprises: water (preferably, 10 to 94.9 wt % (more preferably, 25 to 94 wt %; still more preferably, 40 to 85 wt %; most preferably, 50 to 75 wt %), based on the weight of the fabric care composition, of water); a modified carbohydrate polymer having a weight average molecular weight of <500,000 Daltons (preferably, 50,000 to 480,000 Daltons; more preferably, 75,000 to 475,000 Daltons; most preferably, 80,000 to 450,000 Daltons) and a Kjeldahl nitrogen content corrected for ash and volatiles, TKN, of ≥0.5 wt % (preferably, 0.5 to 5.0 wt %; more preferably, 0.5 to 3.0 wt %; still more preferably, 0.6 to 2.5 wt %; most preferably, 0.6 to 2.25 wt %)(preferably, 0.1 to 3 wt % (more preferably, 0.25 to 2 wt %; most preferably, 0.75 to 1.5 wt %), based on the weight of the fabric care composition, of the modified carbohydrate polymer); and a cleaning surfactant (preferably, 5 to 89.9 wt % (more preferably, 7.5 to 75 wt %; still more preferably, 10 to 60 wt %; most preferably, 15 to 30 wt %), based on the weight of the fabric care composition, of the cleaning surfactant)(preferably, wherein a weight ratio of the modified carbohydrate polymer to the cleaning surfactant in the fabric care composition is 1:5 to 1:60 (preferably, 1:5 to 1:40; more preferably, 1:10 to 1:30; most preferably 1:20 to 1:25)); wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I)

(I)

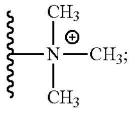

and dimethyl(alkyl) ammonium moieties having formula (II)

(II)

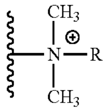

wherein each R is independently selected from a $C_{8-22}$ alkyl group (preferably, wherein each R is independently selected from a $C_{10-16}$ alkyl group; more preferably, wherein each R is independently selected from a $C_{11-14}$ alkyl group; most preferably, wherein each R is a $C_{12}$ alkyl group).

Preferably, the fabric care composition of the present invention, comprises: water. More preferably, the fabric care composition of the present invention, comprises: 10 to 94.9 wt % (more preferably, 25 to 94 wt %; still more preferably, 40 to 85 wt %; most preferably, 50 to 75 wt %), based on the weight of the fabric care composition, of water. Still more preferable, the fabric care composition of the present invention, comprises: 10 to 94.9 wt % (more preferably, 25 to 94 wt %; still more preferably, 40 to 85 wt %; most preferably, 50 to 75 wt %), based on the weight of the fabric care composition, of water, wherein the water is at least one of distilled water and deionized water. Most preferably, the fabric care composition of the present invention, comprises: 10 to 94.9 wt % (more preferably, 25 to 94 wt %; still more preferably, 40 to 85 wt %; most preferably, 50 to 75 wt %), based on the weight of the fabric care composition, of water, wherein the water is distilled and deionized.

Preferably, the fabric care composition of the present invention, comprises: a modified carbohydrate polymer having a weight average molecular weight of <500,000 Daltons (preferably, 50,000 to 480,000 Daltons; more preferably, 75,000 to 475,000 Daltons; most preferably, 80,000 to 450,000 Daltons) and a Kjeldahl nitrogen content corrected for ash and volatiles, TKN, of ≥0.5 wt % (preferably, 0.5 to 5.0 wt %; more preferably, 0.5 to 3.0 wt %; still more preferably, 0.6 to 2.5 wt %; most preferably, 0.6 to 2.25 wt %). More preferably, the fabric care composition of the present invention, comprises: 0.1 to 3 wt % (preferably, 0.25 to 2 wt %; more preferably, 0.75 to 1.5 wt %), based on the weight of the fabric care composition, of a modified carbohydrate polymer having a weight average molecular weight of <500,000 Daltons (preferably, 50,000 to 480,000 Daltons; more preferably, 75,000 to 475,000 Daltons; most preferably, 80,000 to 450,000 Daltons) and a Kjeldahl nitrogen content corrected for ash and volatiles, TKN, of ≥0.5 wt % (preferably, 0.5 to 5.0 wt %; more preferably, 0.5 to 3.0 wt %; still more preferably, 0.6 to 2.5 wt %; most preferably, 0.6 to 2.25 wt %).

Preferably, the carbohydrate polymer is selected from the group consisting of an alkyl cellulose ether, a hydroxyalkyl cellulose ether, a guar gum, a locust bean gum, a *cassia* gum, a tamarind gum (xyloglucan), a xanthan gum, an amylose, an amylopectin, a dextran a scleroglucan and mixtures thereof. More preferably, the carbohydrate polymer is selected from the group consisting of an alkyl cellulose ether, a hydroxyalkyl cellulose ether and mixtures thereof. Preferably, the alkyl cellulose ether is selected from the group of alkyl cellulose ethers, wherein the alkyl ether groups are selected from $C_{1-4}$ alkyl groups (preferably, $C_{1-3}$ alkyl groups; more preferably, methyl groups and ethyl groups).

Preferably, the hydroxyalkyl cellulose ethers are selected from the group of hydroxyalkyl cellulose ethers, wherein the hydoxyalkyl groups are selected from the group consisting of 2-hydroxyethyl groups and 2-hydroxypropyl groups. More than one type of alkyl or hydroxyalkyl group may be present on a cellulose ether. Still more preferably, the carbohydrate polymer is selected from the group consisting of methylcellulose (MC), ethylcellulose (EC), ethyl methyl cellulose, hydroxyethyl cellulose (HEC), hydroxypropyl cellulose (HPC), hydroxyethyl methyl cellulose (HEMC), hydroxypropyl methyl cellulose (HPMC), ethyl hydroxyethyl cellulose (EHEC), carboxymethyl cellulose (CMC) and mixtures thereof. Most preferably, the carbohydrate polymer is a hydroxyethyl cellulose.

Preferably, the fabric care composition of the present invention, comprises: a modified carbohydrate polymer having a weight average molecular weight of <500,000 Daltons (preferably, 50,000 to 480,000 Daltons; more preferably, 75,000 to 475,000 Daltons; most preferably, 80,000 to 450,000 Daltons) and a Kjeldahl nitrogen content corrected for ash and volatiles, TKN, of ≥0.5 wt % (preferably, 0.5 to 5.0 wt %; more preferably, 0.5 to 3.0 wt %; still more preferably, 0.6 to 2.5 wt %; most preferably, 0.6 to 2.25 wt %); wherein the modified carbohydrate polymer is a carbohydrate polymer functionalized with quaternary ammonium moieties; wherein the quaternary ammonium moieties on the modified carbohydrate polymer include both trimethyl ammonium moieties having formula (I)

(I)

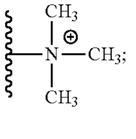

and dimethyl(alkyl) ammonium moieties having formula (II)

(II)

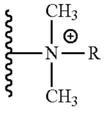

wherein each R is independently selected from a $C_{8-22}$ alkyl group (preferably, wherein each R is independently selected from a $C_{10-16}$ alkyl group; more preferably, wherein each R is independently selected from a $C_{1-14}$ alkyl group; most preferably, wherein each R is a $C_{12}$ alkyl group). Most preferably, the fabric care composition of the present invention, comprises: 0.1 to 3 wt % (preferably, 0.25 to 2 wt %; more preferably, 0.75 to 1.5 wt %), based on the weight of the fabric care composition, of a modified carbohydrate polymer having a weight average molecular weight of <500,000 Daltons (preferably, 50,000 to 480,000 Daltons; more preferably, 75,000 to 475,000 Daltons; most preferably, 80,000 to 450,000 Daltons) and a Kjeldahl nitrogen content corrected for ash and volatiles, TKN, of ≥0.5 wt % (preferably, 0.5 to 5.0 wt %; more preferably, 0.5 to 3.0 wt %; still more preferably, 0.6 to 2.5 wt %; most preferably, 0.6 to 2.25 wt %); wherein the modified carbohydrate polymer is a carbohydrate polymer functionalized with quaternary ammonium moieties; wherein the quaternary ammonium moieties on the modified carbohydrate polymer include both trimethyl ammonium moieties having formula (I); and dimethyl(alkyl) ammonium moieties having formula (II); wherein each R is independently selected from a $C_{8-22}$ alkyl group (preferably, wherein each R is independently selected from a $C_{10-16}$ alkyl group; more preferably, wherein each R is independently selected from a $C_{1-14}$ alkyl group; most preferably, wherein each R is a $C_{12}$ alkyl group). Preferably, the modified carbohydrate polymer is a carbohydrate polymer functionalized with the trimethyl ammonium moieties having formula (I) and the dimethyl(alkyl) ammonium moieties having formula (II) attached to carbohydrate hydroxyl groups on the carbohydrate polymer via a linker. Preferably, the linker is a $C_{2-12}$ aliphatic group, a 2-hydroxypropyl group (i.e., a $—CH_2—CH(OH)—CH_2—$ group), a polyethylene glycol group (i.e., $(—CH_2—CH_2—O—)_x$ group, wherein x is an average of 1 to 10 (preferably, 1 to 6)). Preferably, the modified carbohydrate polymer has a Kjeldahl nitrogen content corrected for ash and volatiles, TKN, of ≥0.5 wt % (preferably, 0.5 to 5.0 wt %; more preferably, 0.5 to 3.0 wt %; still more preferably, 0.6 to 2.5 wt %; most preferably, 0.6 to 2.25 wt %). Preferably, the modified carbohydrate polymer has a mol % substitution ratio of trimethyl ammonium moieties of formula (I) to dimethyl(alkyl ammonium moieties of formula (II) of ≥2 to <100 (preferably, 2 to 99; more preferably, 2 to 50; most preferably, 3 to 10) as determined by NMR.

The modified carbohydrate polymer may be prepared by applying alkylation methods known in the art, e.g., alkylation of a carbohydrate hydroxyl group with either an epoxy-functionalized quaternary ammonium salt or a chlorohydrin-functionalized quaternary ammonium salt in the presence of a suitable base.

Preferably, the fabric care composition of the present invention, comprises: a cleaning surfactant. More preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant. Still more preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant; wherein the cleaning surfactant is selected from the group consisting of anionic surfactants, nonionic surfactants, cationic surfactants, amphoteric surfactants and mixtures thereof. Yet still more preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant; wherein the cleaning surfactant is selected from the group consisting of a mixture including an anionic surfactant and a non-ionic surfactant. Most preferably, the fabric care composition of the present invention, comprises: 5 to 89.9 wt % (preferably, 7.5 to 75 wt %; more preferably, 10 to 60 wt %; most preferably, 15 to 30 wt %), based on the weight of the fabric care composition, of a cleaning surfactant; wherein the cleaning surfactant includes a mixture of a linear alkyl benzene sulfonate, a sodium lauryl ethoxysulfate and a nonionic alcohol ethoxylate.

Anionic surfactants include alkyl sulfates, alkyl benzene sulfates, alkyl benzene sulfonic acids, alkyl benzene sulfonates, alkyl polyethoxy sulfates, alkoxylated alcohols, paraffin sulfonic acids, paraffin sulfonates, olefin sulfonic acids, olefin sulfonates, alpha-sulfocarboxylates, esters of alpha-sulfocarboxylates, alkyl glyceryl ether sulfonic acids, alkyl glyceryl ether sulfonates, sulfates of fatty acids, sulfonates of fatty acids, sulfonates of fatty acid esters, alkyl phenols, alkyl phenol polyethoxy ether sulfates, 2-acryloxy-alkane-1-sulfonic acid, 2-acryloxy-alkane-1-sulfonate, beta-alkyloxy alkane sulfonic acid, beta-alkyloxy alkane sulfonate, amine oxides and mixtures thereof. Preferred anionic surfactants include $C_{8-20}$ alkyl benzene sulfates, $C_{8-20}$ alkyl benzene sulfonic acid, $C_{8-20}$ alkyl benzene sulfonate, paraffin sulfonic acid, paraffin sulfonate, alpha-olefin sulfonic acid, alpha-olefin sulfonate, alkoxylated alcohols, $C_{8-20}$ alkyl phenols, amine oxides, sulfonates of fatty acids, sulfonates of fatty acid esters and mixtures thereof. More preferred anionic surfactants include $C_{12-16}$ alkyl benzene sulfonic acid, $C_{12-16}$ alkyl benzene sulfonate, $C_{12-18}$ paraffin-sulfonic acid, $C_{12-18}$ paraffin-sulfonate and mixtures thereof.

Non-ionic surfactants include secondary alcohol ethoxylates, ethoxylated 2-ethylhexanol, ethoxylated seed oils, butanol caped ethoxylated 2-ethylhexanol and mixtures thereof. Preferred non-ionic surfactants include secondary alcohol ethoxylates.

Cationic surfactants include quaternary surface active compounds. Preferred cationic surfactants include quaternary surface active compounds having at least one of an ammonium group, a sulfonium group, a phosphonium group, an iodinium group and an arsonium group. More preferred cationic surfactants include at least one of a dialkyldimethylammonium chloride and alkyl dimethyl benzyl ammonium chloride. Still more preferred cationic surfactants include at least one of $C_{16-18}$ dialkyldimethylammonium chloride, a $C_{8-18}$ alkyl dimethyl benzyl ammonium chloride di-tallow dimethyl ammonium chloride and di-tallow dimethyl ammonium chloride. Most preferred cationic surfactant includes di-tallow dimethyl ammonium chloride.

Amphoteric surfactants include betaines, amine oxides, alkylamidoalkylamines, alkyl-substituted amine oxides, acylated amino acids, derivatives of aliphatic quaternary ammonium compounds and mixtures thereof. Preferred amphoteric surfactants include derivatives of aliphatic quaternary ammonium compounds. More preferred amphoteric surfactants include derivatives of aliphatic quaternary ammonium compounds with a long chain group having 8 to 18 carbon atoms. Still more preferred amphoteric surfactants include at least one of $C_{12-14}$ alkyldimethylamine oxide, 3-(N,N-dimethyl-N-hexadecyl-ammonio)propane-1-sulfonate, 3-(N,N-dimethyl-N-hexadecylammonio)-2-hydroxypropane-1-sulfonate. Most preferred amphoteric surfactants include at least one of $C_{12-14}$ alkyldimethylamine oxide.

Preferably, the fabric care composition of the present invention, comprises: a modified carbohydrate polymer and a cleaning surfactant; wherein the weight ratio of the modified carbohydrate polymer to the cleaning surfactant in the fabric care composition is 1:5 to 1:60 (preferably, 1:5 to 1:40; more preferably, 1:10 to 1:30; most preferably 1:20 to 1:25).

Preferably, the fabric care composition of the present invention is a laundry detergent.

Preferably, the fabric care composition of the present invention is a laundry detergent. Preferably, the laundry detergent optional comprises additives selected from the group consisting of builders (e.g., sodium citrate), hydrotropes (e.g., ethanol, propylene glycol), enzymes (e.g., protease, lipase, amylase), preservatives, perfumes (e.g., essential oils such as D-limonene), fluorescent whitening agents, dyes, additive polymers and mixtures thereof.

Preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope. More preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is selected from the group consisting of alkyl hydroxides; glycols, urea; monoethanolamine; diethanolamine; triethanolamine; calcium, sodium, potassium, ammonium and alkanol ammonium salts of xylene sulfonic acid, toluene sulfonic acid, ethylbenzene sulfonic acid and cumene sulfonic acid; salts thereof and mixtures thereof. Still more preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is selected from the group consisting of ethanol, propylene glycol, sodium toluene sulfonate, potassium toluene sulfonate, sodium xylene sulfonate, ammonium xylene sulfonate, potassium xylene sulfonate, calcium xylene sulfonate, sodium cumene sulfonate, ammonium cumene sulfonate and mixtures thereof. Yet still more preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope includes at least one of ethanol, propylene glycol and sodium xylene sulfonate. Most preferably, the fabric care composition of the present invention further comprises: 0 to 10 wt % (preferably, 1 to 10 wt %; more preferably, 2 to 8 wt %; most preferably, 5 to 7.5 wt %), based on the weight of the fabric care composition, of a hydrotrope; wherein the hydrotrope is a mixture of ethanol, propylene glycol and sodium xylene sulfonate.

Preferably, the fabric care composition of the present invention further comprises: 0 to 10 wt % (preferably, 0.1 to 10 wt %), based on the weight of the fabric care composition, of a fragrance. More preferably, the fabric care composition of the present invention further comprises: 0 to 10 wt % (preferably, 0.1 to 10 wt %), based on the weight of the fabric care composition, of a fragrance; wherein the fragrance includes an essential oil. Most preferably, the fabric care composition of the present invention further comprises: 0 to 10 wt % (preferably, 0.1 to 10 wt %), based on the weight of the fabric care composition, of a fragrance; wherein the fragrance includes esters (e.g., geranyl acetate); terpenes (e.g., geranol, citronellol, linalool, limonene) and aromatic compounds (e.g., vanilla, eugenol).

Preferably, the fabric care composition of the present invention further comprises: 0 to 30 wt % (preferably, 0.1 to 15 wt %; more preferably, 1 to 10 wt %), based on the weight of the fabric care composition, of a builder. More preferably, the fabric care composition of the present invention further comprises: 0 to 30 wt % (preferably, 0.1 to 15 wt %; more preferably, 1 to 10 wt %), based on the weight of the fabric care composition, of a builder; wherein the builder is selected from the group consisting of inorganic builders (e.g., tripolyphosphate, pyrophosphate); alkali metal carbonates; borates; bicarbonates; hydroxides; zeolites; citrates (e.g., sodium citrate); polycarboxylates; monocarboxylates; aminotrismethylenephosphonic acid; salts of aminotrismethylenephosphonic acid; hydroxyethanediphosphonic acid; salts of hydroxyethanediphosphonic acid; diethylenetriaminepenta(methylenephosphonic acid); salts of diethylenetriaminepenta(methylenephosphonic acid); ethylenediaminetetraethylene-phosphonic acid; salts of ethylenediaminetetraethylene-phosphonic acid; oligomeric phosphonates; polymeric phosphonates; mixtures thereof. Most preferably, the fabric care composition of the present invention further comprises: 0 to 30 wt % (preferably, 0.1 to 15 wt %; more preferably, 1 to 10 wt %), based on the weight of the fabric care composition, of a builder; wherein the builder includes a citrate (preferably, a sodium citrate).

Preferably, the fabric care composition is in a liquid form having a pH from 6 to 12.5; preferably at least 6.5, preferably at least 7, preferably at least 7.5; preferably no greater than 12.25, preferably no greater than 12, preferably no greater than 11.5. Suitable bases to adjust the pH of the formulation include mineral bases such as sodium hydroxide (including soda ash) and potassium hydroxide; sodium bicarbonate, sodium silicate, ammonium hydroxide; and organic bases such as mono-, di- or tri-ethanolamine; or 2-dimethylamino-2-methyl-1-propanol (DMAMP). Mixtures of bases may be used. Suitable acids to adjust the pH of the aqueous medium include mineral acid such as hydrochloric acid, phosphorus acid, and sulfuric acid; and organic acids such as acetic acid. Mixtures of acids may be used. The formulation may be adjusted to a higher pH with base and then back titrated to the ranges described above with acid.

Some embodiments of the present invention will now be described in detail in the following Examples.

The modified carbohydrate polymers in the Examples were characterized as follows.

The volatiles and ash content (measured as sodium chloride) were determined as described in ASTM method D-2364.

The total Kjeldahl nitrogen content (TKN) was determined in duplicate using a Buchi KjelMaster K-375 automatic Kjeldahl analyzer. The TKN values were corrected for volatiles and ash.

Proton NMR characterization of the mole percent of trimethyl ammonium and dimethyl($C_{8-22}$ alkyl) ammonium substitution was determined using a Bruker Avance 500 MHz Nuclear Magnetic Resonance (NMR) spectrometer equipped with the 5 mm broadband observe (BBO) detection probe with z gradient was used for analyzing these dual cationic HEC samples. Approximately 10 to 11 mg of each sample were placed in a vial and swelled in approximately 1.0 g of deuterium oxide (99.9% D) which contained 0.05 weight % 3-trimethylsilylpropionic-2,2,3,3-$d_4$ acid, sodium salt ($D_2O$/TSP). The solutions were placed on a sample shaker to facilitate the dissolution process. Each solution was transferred to a 5 mm NMR tube for the analysis. Each polymer system was analyzed using a standard water suppression pulse program (zgpr), sweep width of 14 ppm, total data of 32K points, acquisition time of 2.3 seconds, relaxation delay of 10 seconds, 45 degree pulse width, 4 dummy scans, & 64 scans. The dimethyl ammonium resonance is centered at 3.36 ppm (6 protons) and the trimethyl ammonium resonance is centered at 3.26 ppm (9 protons). The resonances were integrated, normalized, and the values reported in mole percent.

The 2.0% or 5.0% solution viscosities (corrected for volatiles and ash) was measured at 25.0° C. and shear rate of 6.31 $sec^{-1}$ using a TA Instruments DHR-3 rheometer equipped with a cup and bob sensor. The weight average molecular weight (Mw) of the starting hydroxyethyl cellulose (HEC) polymers was measured by gel permeation chromatography. HEC samples were prepared by dissolving between 0.0465 g and 0.0497 g of sample into 50.0 ml of mobile phase (0.5M acetic acid and 0.1M sodium nitrate in water, triple filtered at 0.45 μm). The samples were then stirred for a minimum of 4 hours with a stir rate of 145 rpm. Aliquots of solution were filtered at 0.5 μm and loaded into injection vials. The GPC/MALS system consists of a Waters 590 HPLC pump coupled to a Waters 717plus autosampler, an Ultrahydrogel Linear 300 mm column coupled to an Ultrahydrogel 2000 column, a Wyatt Dawn DSP 18-angle light scattering detector, and a Waters 2410 refractive index detector. A flow rate of 0.5 ml/min, injection size of 100 μl, and a 50 minute run time were used. The Wyatt detector was calibrated using bovine albumin.

HEC-1: A hydroxyethyl cellulose having a 2.0% aqueous solution viscosity of about 14 mPa·s and a 5.0% aqueous solution viscosity of about 150 mPa-s, about 400 anhydroglucose repeat units, a weight-average molecular weight of about 102,000 Daltons, and an average ethylene oxide molar substitution of about 2.0. This hydroxyethyl cellulose is commercially available as CELLOSIZE™ HEC EP-09 from The Dow Chemical Company.

HEC-2: A hydroxyethyl cellulose having a 2.0% aqueous solution viscosity of about 567 mPa·s, about 1500 anhydroglucose repeat units, a weight-average molecular weight of about 377,000 Daltons, and an average ethylene oxide molar substitution of about 2.0. This hydroxyethyl cellulose is commercially available as CELLOSIZE™ HEC QP-300 from The Dow Chemical Company.

HEC-3: A hydroxyethyl cellulose having a 2.0% aqueous solution viscosity of about 7900 mPa·s, about 3800 anhydroglucose repeat units, a weight-average molecular weight of about 950,000 Daltons, and an average ethylene oxide molar substitution of about 2.0. This hydroxyethyl cellulose is commercially available as CELLOSIZE™ HEC QP-4400H from The Dow Chemical Company.

Synthesis Q1: Modified Hydroxy Ethyl Cellulose

A 500 mL, four-necked, round-bottomed flask fitted with a 60 ml pressure-equalizing addition funnel connected to a nitrogen inlet, a rubber serum cap, a stirring paddle and electric motor, and a Claisen adaptor connected to a subsurface thermocouple connected to a J-KEM controller, and a Friedrich condenser connected to a mineral oil bubbler was charged with 34.45 g of HEC-2, 147.3 g of isopropyl alcohol and 22.7 g of deionized water. The 60 ml pressure-equalizing addition funnel was then charged with a mixture of 23.3 g of 40% aqueous QUAB 342 (3-chloro-2-hydroxypropyl-1-dimethyldodecylammonium chloride) and 5.4 g of 70% aqueous QUAB 151 (glycidyl trimethylammonium chloride). While stirring the flask contents, the head space of the flask was purged with a steady flow of nitrogen at about one bubble per second for one hour to remove any entrained oxygen.

With continued stirring under nitrogen, 7.7 g of 25% aqueous sodium hydroxide solution was then added dropwise to the contents of the flask using a plastic syringe over about 1 minute. The flask contents were then allowed to stir for 30 minutes before the mixture of QUAB 342 & QUAB 151 in the addition funnel was added dropwise to the flask contents over 5 minutes. The flask contents were then allowed to stir for 10 minutes under nitrogen, then the temperature set point on the J-Kem controller was set to 55° C. and the heating mantle was applied to the flask. With continued stirring under nitrogen, the flask contents were maintained at 55° C. for 3 hours.

Then the flask contents were cooled by placing the flask in a cold water bath while maintaining a positive nitrogen pressure in the flask. The flask contents were then neutralized by adding 3.2 g of glacial acetic acid to the flask contents using a syringe and allowing the flask contents to stir for 10 minutes. The flask contents were then vacuum filtered through a large fritted Buchner funnel. The filter cake was washed three times in the Buchner funnel by stirring in the funnel for three minutes with the specified wash solvent for each washing followed by vacuum removal of the wash liquor: first wash was with a wash solvent mixture of 246 g of isopropyl alcohol and 54 g of distilled water, the second wash was with a wash solvent mixture of 270 g of isopropyl alcohol and 30 g of distilled water, and the third wash was with a wash solvent mixture of 300 g of isopropyl alcohol containing 0.4 g of 40% glyoxal and 0.1 g of glacial acetic acid. The product modified hydroxyethyl cellulose wash then recovered by vacuum filtration, briefly air dried, and then dried overnight in vacuo at 50° C.

The product modified hydroxyethyl cellulose obtained was an off-white solid (35.2 g), with a volatiles content of 3.72%, an ash content (as sodium chloride) of 2.35%, and a Kjeldahl nitrogen content (corrected for ash and volatiles) of 0.752%. The 2.0% solution viscosity (corrected for ash and volatiles) was measured at 6.31 $sec^{-1}$ using a TA Instruments DHR-3 rheometer at 25.0° C. equipped with a cup and bob sensor and was found to be 397 mPa-sec. The mol % of QUAB 151 residues (formula (I) trimethyl ammonium groups) was 91 mol % and the mol % of QUAB 342 residues (formula (II) dimethyl alkyl ammonium groups) was 9 mol % as reported in Table 1.

Synthesis Q2-Q11: Modified Hydroxy Ethyl Cellulose

The product modified hydroxyethyl cellulose of Synthesis Q2-Q11 was prepared using the same process as described above for Synthesis Q1, with appropriate changes in raw material charges to provide the formula (I) TKN, mol % formula (I) trimethyl ammonium and mol % formula (II) dimethyl alkyl ammonium substitution as reported Table 1.

TABLE 1

| | | | Mol % by NMR | | Mol % substitution ratio | |
|---|---|---|---|---|---|---|
| Ex. | HEC | TKN (%) | Trimeth Form (I) | Dimeth Form (II) | Form (I)/ Form (II) | $M_w$* |
| Q1 | HEC-2 | 0.75 | 91 | 9 | 10.1 | 403,000 |
| Q2 | HEC-1 | 0.71 | 80 | 20 | 4.0 | 108,000 |
| Q3 | HEC-1 | 1.31 | 77 | 23 | 3.3 | 117,000 |
| Q4 | HEC-2 | 0.67 | 87 | 13 | 6.7 | 404,000 |
| Q5 | HEC-2 | 0.64 | 87 | 13 | 6.7 | 403,000 |
| Q6 | HEC-2 | 1.55 | 97 | 3 | 32.3 | 451,000 |
| Q7 | HEC-2 | 2.12 | 99 | 1 | 99.0 | 487,000 |
| Q8 | HEC-2 | 0.65 | 80 | 20 | 4.0 | 403,000 |
| Q9 | HEC-2 | 0.80 | 90 | 10 | 9.0 | 411,000 |
| Q10 | HEC-2 | 2.34 | 99 | 1 | 99.0 | 503,000 |
| Q11 | HEC-3 | 0.61 | 80 | 20 | 4.0 | 1,020,000 |

*Calculated from molecular weight of starting material with correction for substitution based on measured nitrogen content and NMR data.

Generic Laundry Detergent Base Formulation

The generic laundry detergent base formulation used in the softening and anti-redeposition tests in the subsequent Examples had a formulation as described in TABLE 2 and was prepared by standard laundry formulation preparation procedure.

TABLE 2

| Ingredient | Commercial Name | wt % |
|---|---|---|
| Linear alkyl benzene sulfonate | Nacconal 90G* | 11.1 |
| Sodium lauryl ethoxysulfate | Steol CS-460* | 6.7 |
| Propylene glycol | — | 5.0 |
| Ethanol | — | 2.0 |
| Nonionic alcohol ethoxylate | Biosoft N25-7* | 8.0 |
| NaOH (10% solution) | — | Adjust pH to 8.0 |
| Deionized water | — | QS to 100 |

*available from Stepan Company

Comparative Examples CF1-CF7 and Examples F1-F9: Fabric Care Composition

Fabric care compositions were prepared in each of Comparative Examples CF1-CF7 and Examples F1-F9 by mixing 1 g of commercially available modified hydroxyethyl cellulose or modified hydroxyethyl cellulose as prepared according to the Synthesis as noted in TABLE 3 or commercially available under the with 100 g of the generic laundry detergent base formulation detailed in TABLE 2.

TABLE 3

| Example | Modified Hydroxyethyl Cellulose |
|---|---|
| CF1 | — |
| CF2 | prepared according to Synthesis Q11 |
| CF3 | Polymer PK* |
| CF4 | prepared according to Synthesis Q10 |
| CF5 | Ucare ™ JR400* |
| CF6 | Ucare ™ LK* |
| CF7 | Ucare ™ LR400* |
| F1 | prepared according to Synthesis Q8 |
| F2 | prepared according to Synthesis Q3 |
| F3 | prepared according to Synthesis Q2 |
| F4 | prepared according to Synthesis Q6 |
| F5 | prepared according to Synthesis Q5 |
| F6 | prepared according to Synthesis Q4 |
| F7 | prepared according to Synthesis Q1 |

TABLE 3-continued

| Example | Modified Hydroxyethyl Cellulose |
|---|---|
| F8 | prepared according to Synthesis Q7 |
| F9 | prepared according to Synthesis Q9 |

*available from The Dow Chemical Company

Compatibility/Stability

The compatibility/stability of the fabric care compositions was evaluated by placing a sample of each of the compositions of Comparative Examples CF1-CF7 and Examples F1-F9 in an oven set at 50° C. for 24 hours and observed. All of the fabric care compositions were observed to remain clear and stable except for that of Example F9, which formed a gel-like precipitate.

Soil Anti-Redeposition

The soil anti-redeposition of the fabric care compositions was evaluated for each of the compositions of Comparative Examples CF1-CF7 and Examples F1-F9 on two types of fabric (cotton interlock, CI, and polyester/cotton blend, Blend) by washing the fabrics in a Terg-O-tometer under typical washing conditions (ambient wash temperature, water hardness: 300 ppm Ca:Mg of 2:1 mole ratio, with a 12 minute wash and a 3 minute rinse) using a standard detergent dosage of 1 g/L and an orange (high iron content) clay slurry as the added soil load. The garments were laundered for 5 consecutive cycles and the whiteness index was measured at 460 nm using a HunderLab UltraScan VIS Colorimeter to determine fabric whiteness in accordance with ASTM E313. The whiteness index for the neat unwashed fabrics was used as the positive control. The results are provided in TABLE 4.

TABLE 4

| | | Whiteness | |
|---|---|---|---|
| Ex. | Modified Hydroxyethyl Cellulose | CI | Blend |
| Positive Control | — | 83 | 96 |
| CF1 | — | 48 | 79 |
| CF2 | prepared according to Synthesis Q11 | 36 | 73 |
| CF3 | Polymer PK* | 31 | 51 |
| CF4 | prepared according to Synthesis Q10 | 28 | 52 |
| CF5 | Ucare ™ JR400* | 27 | 66 |
| CF6 | Ucare ™ LK* | 24 | 80 |
| CF7 | Ucare ™ LR400* | 19 | 61 |
| F1 | prepared according to Synthesis Q8 | 69 | 80 |
| F2 | prepared according to Synthesis Q3 | 67 | 86 |
| F3 | prepared according to Synthesis Q2 | 67 | 78 |
| F4 | prepared according to Synthesis Q6 | 50 | 75 |
| F5 | prepared according to Synthesis Q5 | 45 | 81 |
| F6 | prepared according to Synthesis Q4 | 45 | 80 |
| F7 | prepared according to Synthesis Q1 | 44 | 78 |
| F8 | prepared according to Synthesis Q7 | 44 | 77 |
| F9 | prepared according to Synthesis Q9 | 39 | 72 |

*available from The Dow Chemical Company

Generic Laundry Detergent Base Formulation

The generic laundry detergent base formulation used in the softening and anti-redeposition tests in the subsequent Examples had a formulation as described in TABLE 5 and was prepared by standard laundry formulation preparation procedure.

TABLE 5

| Ingredient | Commercial Name | wt % |
|---|---|---|
| Linear alkyl benzene sulfonate | Nacconal 90G* | 17.8 |
| Sodium lauryl ethoxysulfate | Steol CS-460* | 6.7 |
| Propylene glycol | — | 5.0 |
| Ethanol | — | 2.0 |
| Sodium citrate | — | 5.0 |
| Nonionic alcohol ethoxylate | Biosoft N25-7* | 10.0 |
| Sodium xylene sulfonate | Stepanate SXS-93* | 2.7 |
| NaOH (10% solution) | — | Adjust pH to 12.0 |
| Deionized water | — | QS to 100 |

*available from Stepan Company

Comparative Examples CF8-CF14 and Examples F10-F17: Fabric Care Composition

Fabric care compositions were prepared in each of Comparative Examples CF8-CF14 and Examples F10-F17 by mixing 1 g of commercially available modified hydroxyethyl cellulose or modified hydroxyethyl cellulose as prepared according to the Synthesis as noted in Table 6 or commercially available under the with 100 g of the generic laundry detergent base formulation detailed in Table 5.

TABLE 6

| Example | Modified Hydroxyethyl Cellulose |
|---|---|
| CF8 | — |
| CF9 | prepared according to Synthesis Q11 |
| CF10 | Polymer PK* |
| CF11 | prepared according to Synthesis Q10 |
| CF12 | Ucare ™ JR400* |
| CF13 | Ucare ™ LK* |
| CF14 | Ucare ™ LR400* |
| F9 | prepared according to Synthesis Q8 |
| F10 | prepared according to Synthesis Q3 |
| F11 | prepared according to Synthesis Q2 |
| F12 | prepared according to Synthesis Q6 |
| F13 | prepared according to Synthesis Q5 |
| F14 | prepared according to Synthesis Q4 |
| F15 | prepared according to Synthesis Q1 |
| F16 | prepared according to Synthesis Q7 |
| F17 | prepared according to Synthesis Q9 |

*available from The Dow Chemical Company

Softening

The softening of the fabric care compositions was evaluated for each of the compositions of Comparative Examples CF8-CF14 and Examples F10-F17 by laundering 12 in.×12 in. terry cotton towels in a top loading washing machine (SpeedQueen, medium load, heavy duty wash) utilizing typical North American washing conditions of 35 g of the fabric care composition per wash cycle, water hardness: 150 ppm Ca:Mg of 2:1 mole ratio, ambient temperature. The terry cotton towels were removed after 3 wash cycles, then assessed for softening by a group of panelists in a blind study. Internal controls (harsh and soft control towels) were placed alongside laundered pairs of terry cloth towels, and a ranking system of 1-10 was employed (1=harsh, 10=soft). The internal soft control was prepared by washing terry cotton towels with 35 g GLDF and 50 g Snuggle© rinse aid fabric softener in a top loading washing machine (SpeedQueen, medium load, heavy duty wash) for 1 cycle. The internal harsh control was prepared by washing terry cotton towels with 35 g of the generic laundry formulation described in Table 5 in a top loading washing machine (SpeedQueen, medium load, heavy duty wash) for 1 cycle. The panelists individually evaluated the towels and recorded their observations. The averages of those evaluation observations are provided in Table 7.

TABLE 7

| Ex. | Modified Hydroxyethyl Cellulose | Softening |
|---|---|---|
| Harsh Control | — | 1.0 |
| Soft Control | — | 10.0 |
| CF8 | — | 2.5 |
| CF9 | prepared according to Synthesis Q11 | 4.9 |
| CF10 | Polymer PK* | 4.0 |
| CF11 | prepared according to Synthesis Q10 | 2.9 |
| CF12 | Ucare ™ JR400* | 4.6 |
| CF13 | Ucare ™ LK* | 5.2 |
| CF14 | Ucare ™ LR400* | 5.9 |
| F9 | prepared according to Synthesis Q8 | 4.6 |
| F10 | prepared according to Synthesis Q3 | 5.8 |
| F11 | prepared according to Synthesis Q2 | 5.0 |
| F12 | prepared according to Synthesis Q6 | 4.6 |
| F13 | prepared according to Synthesis Q5 | 5.2 |
| F14 | prepared according to Synthesis Q4 | 6.2 |
| F15 | prepared according to Synthesis Q1 | 4.4 |
| F16 | prepared according to Synthesis Q7 | 5.1 |
| F17 | prepared according to Synthesis Q9 | 3.6 |

*available from The Dow Chemical Company

Fragrance Containing Laundry Detergent Base Formulation

The fragrance containing laundry detergent base formulation used in the fragrance deposition tests in the subsequent Examples had a formulation as described in Table 8 and was prepared by standard laundry formulation preparation procedure.

TABLE 8

| Ingredient | Commercial Name | wt % |
|---|---|---|
| Linear alkyl benzene sulfonate | Nacconal 90G* | 11.1 |
| Sodium lauryl ethoxysulfate | Steol CS-460* | 6.7 |
| Propylene glycol | — | 5.0 |
| Ethanol | — | 2.0 |
| Nonionic alcohol ethoxylate | Biosoft N25-7* | 8.0 |
| D-limonene (fragrance) | Orange oil | 1.0 |
| NaOH (10% solution) | — | Adjust pH to 8.0 |
| Deionized water | — | QS to 100 |

*available from Stepan Company

Comparative Examples CF15-CF16 and Examples F18-F21

Fragrance Fabric Care Composition

Fabric care compositions were prepared in each of Comparative Examples CF15-CF16 and Examples F18-F21 by mixing 1 g of commercially available modified hydroxyethyl cellulose or modified hydroxyethyl cellulose as prepared according to the Synthesis as noted in Table 9 or commercially available under the with 100 g of the fragrance containing laundry detergent base formulation detailed in Table 8.

TABLE 9

| Example | Modified Hydroxyethyl Cellulose |
|---|---|
| CF15 | — |
| CF16 | Polymer PK* |
| F18 | prepared according to Synthesis Q1 |
| F19 | prepared according to Synthesis Q5 |
| F20 | prepared according to Synthesis Q6 |
| F21 | prepared according to Synthesis Q2 |

*available from The Dow Chemical Company

Fragrance In-Wash Deposition

The fragrance in wash deposition of the fragrance fabric care compositions was evaluated for each of the compositions of Comparative Examples CF15-CF16 and Examples F18-F21 on cotton cloth. The cotton cloth was laundered with the fragrance fabric care compositions in a Terg-O-tometer under typical washing conditions (ambient wash temperatures, water hardness: 150 ppm Ca:Mg of 2:1 mole ratio, three 15 minute wash cycles and one three minute rinse) using a fragrance fabric care composition dosage of 0.5 g/L.

The fragrance deposition on the cotton cloth was then determined by the following procedure. First, each washed fabric sample was carefully transferred into a 1 oz vial. Hexane (20 mL) was then added to the vial. Each sample was then shaken for 1 hour on a shaker. The solution phase was then filtered from each sample through a 0.2 μm PTFE filter into an autosampler vial. The recovered solution phase was then analyzed by gas chromatograph/mass spectrometer (GC/MS) using the noted calibration standards and GC/MS conditions. The results are provided in Table 11.

A 1,000 mg/L stock calibration solution was prepared by dissolving 20 mg of pure D-limonene in 20 mL of hexane. Calibration standard solutions covering the concentration range of 1 to 100 ppm D-Limonene were then prepared from the stock standard solution using hexane as the diluent.

The GC/MS conditions used are provided in Table 10.

TABLE 10

| | |
|---|---|
| Instrument: | Agilent 7890 GC coupled with an Agilent 5977 MSD |
| Column: | DB-5MS UI, 30 m × 0.25 mm × 0.5 μm film |
| GC Oven: | Initial 50° C. (hold 2 minutes) to 240° C. at 20° C./minute (hold 3 minutes) |
| Carrier Gas: | Helium at constant flow of 1.4 mL/min. |
| | Inlet: Injection volume: 1 μL |
| | Split ratio: 10:1 |
| | Temperature: 240° C. |
| MS Detector: | Transfer line temperature: 240° C. |
| | MS Ion source (E1) temperatures: 250° C. |
| | MS Quad temperature: 130° C. |
| | EMVolts: 2076 V |
| | Energy: 70 eV |
| | Emission: 35 μA |
| | Gain factor: 0.5 |
| | SIM ion: m/z 60 (quantification), 100 ms dwell time; m/z 136 (confirmation), 100 ms dwell time |

TABLE 11

| Ex. | Modified Hydroxyethyl Cellulose | % improvement in fragrance deposition relative to CF9 |
|---|---|---|
| CF15 | — | 0 |
| CF16 | Polymer PK* | 46 |
| F18 | prepared according to Synthesis Q1 | 35 |
| F19 | prepared according to Synthesis Q5 | 53 |
| F20 | prepared according to Synthesis Q6 | 41 |
| F21 | prepared according to Synthesis Q2 | 54 |

TABLE 11-continued

*available from The Dow Chemical Company

We claim:

1. A fabric care composition consisting of:

water;

a modified carbohydrate polymer having a weight average molecular weight of <500,000 Daltons and a Kjeldahl nitrogen content corrected for ash and volatiles, TKN, of >0.5 wt %; and a cleaning surfactant;

optionally, a builder which is an inorganic phosphate, an alkali metal carbonate, a borate, a bicarbonate, a hydroxide, a zeolite, a citrate, a polycarboxylate, a monocarboxylate, aminotrismethylenephosphonic acid, a salt of aminotrismethylenephosphonic acid, hydroxyethanediphosphonic acid, a salt of hydroxyethanediphosphonic acid, diethylenetriaminepenta(methylenephosphonic acid), a salt of diethylenetriaminepenta(methylenephosphonic acid), ethylenediaminetetraethylene-phosphonic acid, a salt of ethylenediaminetetraethylene-phosphonic acid, an oligomeric phosphonate, a polymeric phosphonate, or a mixture or two or more thereof;

optionally, a hydrotrope which is an alkyl hydroxide, a glycol, a urea, monoethanolamine, diethanolamine, triethanolamine, calcium, sodium, potassium, ammonium and alkanol ammonium salts of xylene sulfonic acid, toluene sulfonic acid, ethylbenzene sulfonic acid, cumene sulfonic acid, and mixtures of two or more thereof;

optionally, an enzyme;

optionally, a preservative;

optionally, a perfume;

optionally, a fluorescent whitening agent;

optionally, a mineral base or a mineral acid and optionally, a dye;

wherein the modified carbohydrate polymer is a carbohydrate polymer functionalized with quaternary ammonium moieties; wherein the quaternary ammonium moieties on the modified carbohydrate polymer include: trimethyl ammonium moieties having formula (I)

(I)

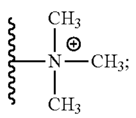

and dimethyl(alkyl) ammonium moieties having formula (II)

(II)

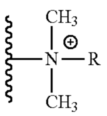

wherein each R is independently selected from a $C_{8-22}$ alkyl group;

wherein a weight ratio of the modified carbohydrate polymer to the cleaning surfactant in the fabric care composition is 1:5 to 1:40.

2. The fabric care composition of claim 1, further comprising 0.1 to 15 wt %, based on weight of the fabric care composition, of a builder.

3. The fabric care composition of claim 2, wherein the modified carbohydrate polymer has a weight average molecular weight of 50,000 to 480,000 Daltons and a Kjeldahl nitrogen content corrected for ash and volatiles of 0.5 to 3.0 wt %.

4. The fabric care composition of claim 3, wherein the modified carbohydrate polymer has a mol % substitution ratio of trimethyl ammonium moieties of formula (I) to dimethyl(alkyl) ammonium moieties of formula (II) of ≥2 to <100, or the modified carbohydrate polymer is a modified hydroxyethyl cellulose and wherein the weight ratio of the modified carbohydrate polymer to the cleaning surfactant in the fabric care composition is 1:10 to 1:30.

5. The laundry detergent of claim 4, wherein the modified carbohydrate polymer has a mol % substitution ratio of trimethyl ammonium moieties of formula (I) to dimethyl (alkyl) ammonium moieties of formula (II) of 3 to 10.

6. The fabric care composition of claim 3, wherein the fabric care composition is a laundry detergent.

7. The laundry detergent of claim 6, wherein the cleaning surfactant is selected from the group consisting of anionic surfactants, nonionic surfactants, cationic surfactants, amphoteric surfactants and mixtures thereof.

8. The laundry detergent of claim 7, wherein the weight ratio of the modified carbohydrate polymer to the cleaning surfactant in the fabric care composition is 1:20 to 1:25.

* * * * *